United States Patent [19]

Shope

[11] Patent Number: 5,358,066
[45] Date of Patent: Oct. 25, 1994

[54] MOTOR VEHICLE DRIVE SYSTEM

[75] Inventor: William W. Shope, Dearborn, Mich.

[73] Assignee: General Motors Corporation, Detroit, Mich.

[21] Appl. No.: 18,590

[22] Filed: Feb. 17, 1993

[51] Int. Cl.$^5$ .............................................. B60K 17/24
[52] U.S. Cl. .................................... 180/380; 180/381
[58] Field of Search ............... 180/379, 380, 381, 376, 180/383

[56] References Cited

U.S. PATENT DOCUMENTS

| | | |
|---|---|---|
| 2,027,329 | 1/1936 | Van Ranst . |
| 2,092,291 | 9/1937 | Olsen . |
| 2,563,980 | 8/1951 | Wahlberg . |
| 2,930,660 | 3/1960 | Dunn . |
| 3,053,584 | 9/1962 | Dunn ................... 180/381 |
| 3,167,149 | 1/1965 | Miller et al. . |
| 4,771,842 | 9/1988 | Mishio et al. ......... 180/381 |
| 5,036,943 | 8/1991 | Kashiwagi ............ 180/381 |
| 5,145,025 | 9/1992 | Damian ................. 180/381 |
| 5,267,623 | 12/1993 | Kashiwagi ........... 180/380 |

FOREIGN PATENT DOCUMENTS 2824241 12/1979 Fed. Rep. of Germany ...... 180/381

OTHER PUBLICATIONS

1992 Corvette Preliminary Service Manual, pp. OB-6 and 4A-7.
1992 Camaro Service Manual, p. OB-10.

*Primary Examiner*—Brian L. Johnson
*Assistant Examiner*—Peter C. English
*Attorney, Agent, or Firm*—Saul Schwartz

[57] ABSTRACT

A drive system for a motor vehicle of the type having a front engine/transmission power unit mounted through engine mounts on a sprung mass portion of the vehicle, a rear drive axle resiliently connected to the sprung mass portion, and a torque beam for reacting drive torque and brake torque from the drive axle to the power unit. The drive system includes a front propeller shaft, a rear propeller shaft, a first universal joint between the power unit and the front propeller shaft, a second universal joint between the drive axle and the rear propeller shaft, a third universal joint between the front and the rear propeller shafts, and a shaft support rotatably connected to one of the front and the rear propeller shafts and rigidly attached to the torque beam. Vibratory forces developed in the front and rear propeller shafts are attenuated by a flexible isolator in the shaft support and by the engine mounts and the resilient connection of the drive axle to the sprung mass portion.

3 Claims, 2 Drawing Sheets

# MOTOR VEHICLE DRIVE SYSTEM

FIELD OF THE INVENTION

This invention relates to motor vehicle drive systems.

BACKGROUND OF THE INVENTION

Motor vehicles commonly include an engine/transmission unit at the front of the vehicle, a drive axle at the rear of the vehicle, and a propeller shaft spanning the longitudinal distance between a transmission output shaft and a differential pinion input shaft. One-piece propeller shafts are common where the span is relatively short and have been used in combination with torque beams that react brake and acceleration torque from the drive axle to the engine/transmission unit. Two-piece or split-shaft propeller shafts are common where the span is longer and usually include a short front shaft, a short rear shaft, a universal joint between the front and rear shafts, and a shaft support on the vehicle body or frame to rotatably support the split-shaft where the front and rear shafts are connected. Solid, one-piece shafts have been used in long span environments inside of torque tubes connected at opposite ends to the engine/transmission unit and to the drive axle. Some torque tube systems have also included a resiliently backed bearing mounted in the torque tube generally at the center of the long, solid shaft. A motor vehicle drive system according to this invention is an improvement over prior systems having split-shaft propeller shafts and one-piece, solid shafts.

SUMMARY OF THE INVENTION

This invention is a new and improved motor vehicle drive system including a split-shaft propeller shaft and a longitudinal torque beam parallel to the propeller shaft having a front end pivotally connected to an engine/transmission unit and a rear end bolted to a drive axle. The split-shaft propeller shaft includes a tubular front propeller shaft connected to a transmission output shaft through a first universal joint, a tubular rear propeller shaft connected to a differential pinion input shaft thorough a second universal joint, and a third universal joint connecting the front and the rear propeller shafts for unitary rotation. A center support of the drive system is rotatably connected to one of the front and the rear propeller shafts near the third universal joint and is mounted on the longitudinal torque beam. Vibratory forces developed at the middle of the split-shaft propeller shaft are attenuated through a flexible isolator of the shaft support and through the resilient connections through which the engine/transmission unit and the drive axle of the motor vehicle are connected to the body and/or the chassis of the motor vehicle. In a preferred embodiment, the third universal joint is a stroking constant velocity universal joint.

DESCRIPTION OF A PREFERRED EMBODIMENT

Figure 1:
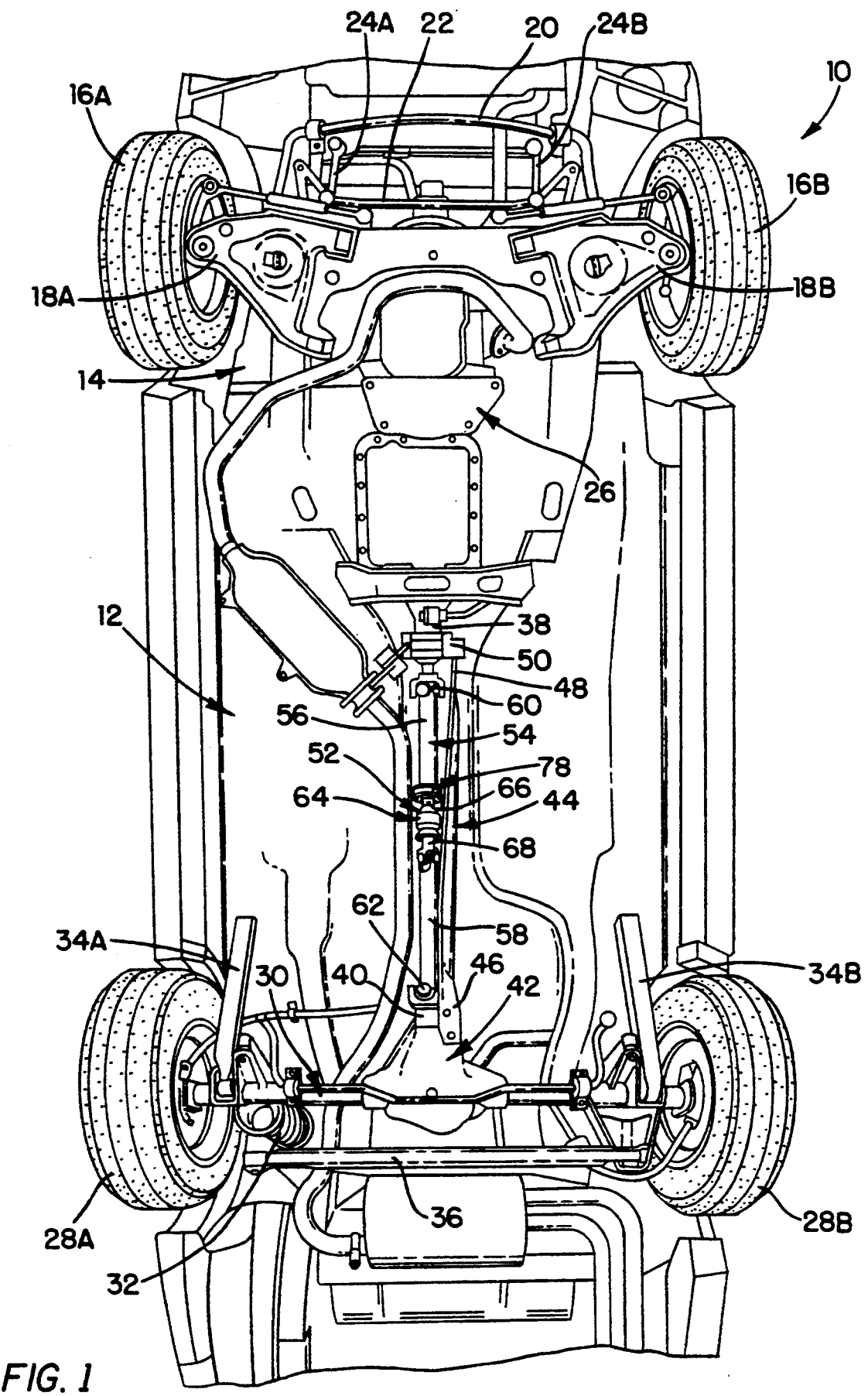
FIG. 1 is view of the underside of a motor vehicle having a drive system according to this invention.
Figure 2:
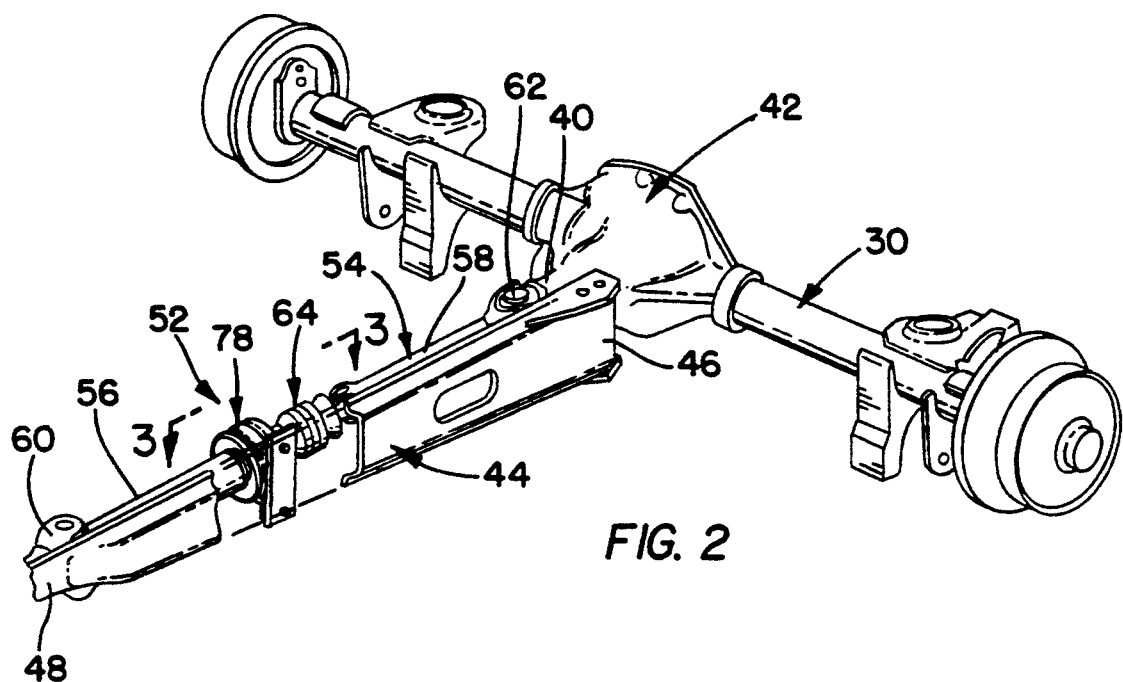
FIG. 2 is a fragmentary perspective view of a drive system according to this invention.

Referring to FIG. 1, a representative motor vehicle 10 of unit-body type construction includes a structurally rigid body portion 12 and a structurally rigid front frame portion 14. The front frame portion is rigidly connected to the body portion and functions as a support platform for a plurality of suspension and steering components associated with a pair of steerable front wheels 16A-B of the motor vehicle including, for example, a pair of lower control arms 18A-B, a torsion bar 20, a steering drag link 22, and a pair of steering idler arms 24A-B.

The front frame portion 14 also defines a support platform for an engine/transmission unit 26 of the motor vehicle, referred to herein as the power unit. The structural housings of the engine and the transmission form a rigid assembly which is mounted on the front frame portion 14 through conventional vibratory force attenuating engine mounts, not shown. U.S. Pat. No. 4,588,173, issued 13 May 1986 and assigned to the assignee of this invention, describes representative engine mounts. The body portion, the front frame portion, and the elements mounted thereon constitute the sprung mass portion of the motor vehicle 10.

A pair of rear wheels 28A-B are rotatably supported in conventional fashion at opposite ends of a drive axle 30 of the motor vehicle. The body portion 12 is suspended directly on the drive axle 30 by a pair of coil springs, only a single spring 32 being visible in FIG. 1. The positional relationship between the drive axle 30 and the body portion 12 is controlled by a plurality of suspension links each pivotally connected through resilient bushings, not shown, to the drive axle and to the body portion and including, for example, a pair of trailing arms 34A-B and a lateral control rod 36. The front wheels, the rear wheels and the drive axle constitute the unsprung mass portion of the motor vehicle 10.

The power output of the power unit 26 is through a transmission output shaft rotatably supported in an end portion 38 of the power unit 26 in a longitudinal center plane of the motor vehicle 10. The power input to the drive axle 30 is through a differential pinion shaft rotatably supported in a pinion nose 40 of a differential housing 42 of the drive axle in the longitudinal center plane of the vehicle. A torque beam 44 parallel to the longitudinal center plane of the vehicle has a trailing end 46 and a forward end 48. The trailing end 46 is bolted to the differential housing 42. The forward end is connected to the power unit 26 for limited universal pivotal movement through a resilient connector 50. A drive system 52 according to this invention is disposed between the transmission output shaft and the differential pinion input shaft.

The drive system 52 according to this invention includes a split-shaft propeller shaft 54 consisting of a tubular front propeller shaft 56 and a tubular rear propeller shaft 58. A first universal joint 60 of the drive system 52 connects the front propeller shaft 56 to the transmission output shaft in conventional fashion for rotation as a unit with the transmission shaft and for longitudinal sliding movement relative thereto. A second universal joint 62 of the drive system 52 connects the rear propeller shaft 58 to the differential pinion input shaft in conventional fashion for rotation as a unit with the input shaft.

Figure 3:
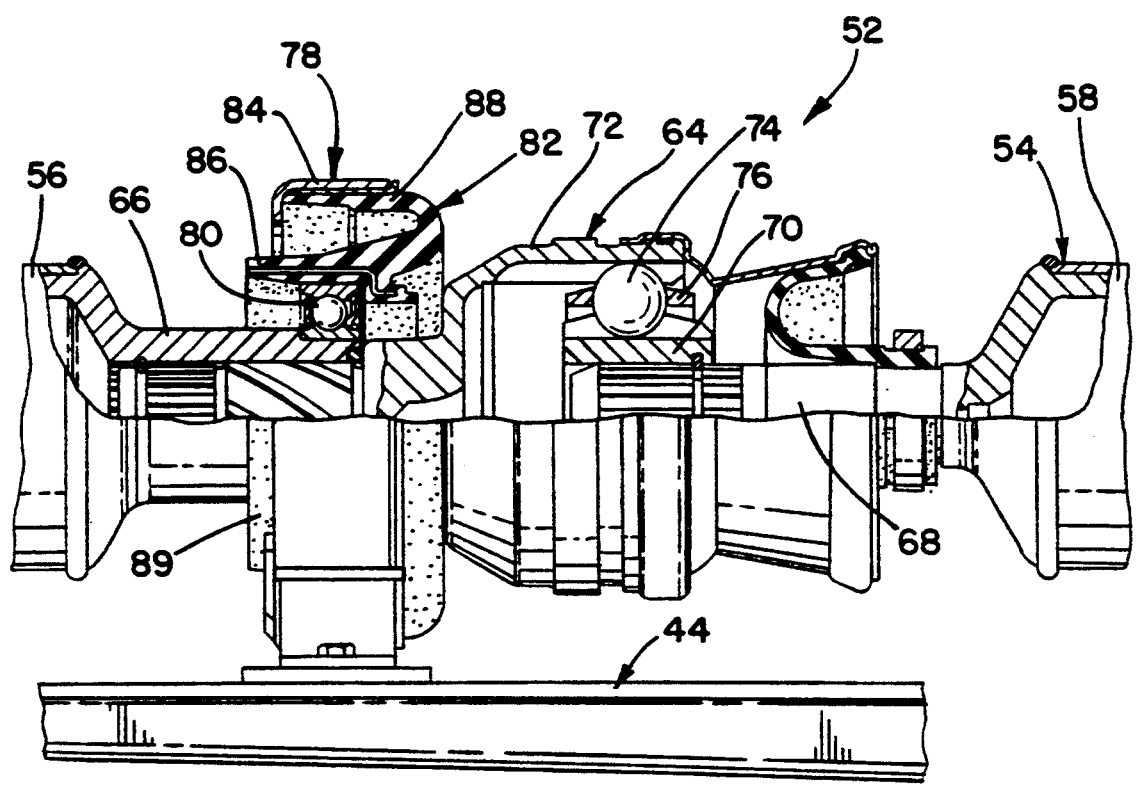
FIG. 3 is an enlarged partially broken-away view taken generally along the plane indicated by lines 3—3 in FIG. 2.

As seen best in FIG. 3, a third universal joint 64 of the drive system 52 connects a reduced diameter rear end 66 of the front propeller shaft 56 to a reduced diameter forward end 68 of the rear propeller shaft for unitary rotation. The third universal joint is a stroking constant velocity joint and includes a hub 70 spline connected to the forward end 68 of the rear propeller shaft, an outer housing 72 spline connected to the rear end 66 of the front propeller shaft, and a plurality of bearing balls 74 in grooves in the housing and the hub. A separator 76 with apertures for the bearing balls 74 retains the bearing balls between the housing and the hub.

A shaft support 78 of the drive system 52 includes a bearing 80, a flexible annular isolator 82, and a housing 84. The bearing 80 has an inner race press fitted on the reduced diameter end 66 of the front propeller shaft adjacent the third universal joint 64 and an outer race bonded to a reinforced inner ring 86 of the flexible isolator 82. An outer ring 88 of the flexible isolator 82 is bonded to the housing 84 of the shaft support. The housing 84 is bolted to the torque beam 44 about midway between the power unit 26 and the differential housing 42.

The shaft support 78 rotatably supports the middle portion of the split-shaft propeller shaft 54 on the torque beam 44. Importantly, the drive system 52 according to this invention attenuates vibratory forces developed by the split-shaft propeller shaft through multiple mechanisms including the flexible isolator 82, the engine mounts of the power unit 26, and the springs and resilient bushings connecting the drive axle 30 and its suspension linkage to the body portion 12.

For example, where an operating mode of the power unit 26 induces lateral vibration at the first universal joint 60, the annular isolator 82 of the shaft support 78 attenuates some of the corresponding lateral vibratory forces developed at the middle portion of the split-shaft propeller shaft. Vibratory forces conducted through the annular isolator 82 to the housing 84 of the shaft support are transferred directly to the torque beam and by the attachments at the ends of the torque beam to the power unit 26 and to the drive axle 30. Then, the engine mounts and the resilient drive axle mounting elements further attenuate vibratory forces to minimize transmission of such forces to the body portion 12 for maximum passenger comfort.

The embodiments of the invention in which an exclusive property or privilege is claimed are defined as follows:

1. In a motor vehicle having a sprung mass portion, a power unit supported on said sprung mass portion through a vibratory force attenuating engine mount means, an unsprung mass portion including a drive axle, means resiliently connecting said drive axle to said sprung mass portion for suspension excursions of said drive axle relative to said sprung mass portion, and a longitudinal torque beam having a front end pivotally connected to said power unit and a trailing end rigidly connected to said drive axle for reacting drive torque and brake torque from said drive axle to said power unit, a drive system comprising:

a tubular front propeller shaft parallel to said torque beam, a tubular rear propeller shaft parallel to said torque beam, a first universal joint connecting a first end of said front propeller shaft to an output shaft of said power unit for rotation and for relative pivotal movement, a second universal joint connecting a first end of said rear propeller shaft to an input shaft of said drive axle for unitary rotation and for relative pivotal movement, a third universal joint connecting a second end of said rear propeller shaft to a second end of said front propeller shaft for unitary rotation and for relative pivotal movement, a propeller shaft support including a bearing connected to one of said front and said rear propeller shafts generally adjacent said third universal joint and a housing and a flexible isolator between said bearing and said housing, and means rigidly connecting said housing of said propeller shaft support to said torque beam whereby said one of said front and said rear propeller shafts is rotatably supported on said torque beam and lateral vibratory forces of said front and said rear propeller shafts are attenuated through said isolator of said propeller shaft support and through said engine mount means and said resilient means connecting said drive axle and said sprung mass portion.

2. The drive system recited in claim 1 wherein said third universal joint is a stroking constant velocity universal joint.

3. The drive system recited in claim 1 wherein said bearing in said propeller shaft support is connected to said second end of said front propeller shaft.

* * * * *